S. H. BEVINS, J. WEIS, & W. H. PHILLIPS.
Brake Mechanism for Hoisting Apparatus.
No. 201,150.  Patented March 12, 1878.
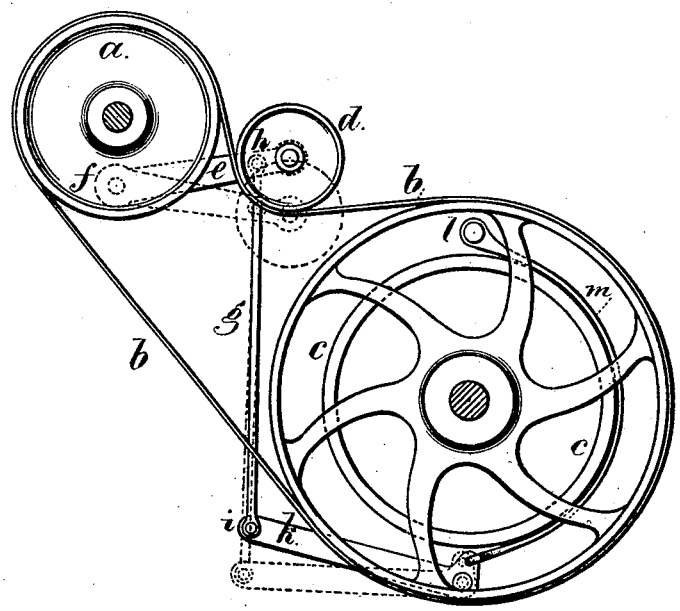
Witnesses
Chas H. Smith
William G. Mott
Inventors.
Seth H. Bevins
Joseph Weis
William H. Phillips
per Lemuel W. Serrell

UNITED STATES PATENT OFFICE.

SETH H. BEVINS, OF NEW YORK, N. Y., JOSEPH WEIS, OF JERSEY CITY, N. J., AND WILLIAM H. PHILLIPS, OF NEW YORK, N. Y.

IMPROVEMENT IN BRAKE MECHANISMS FOR HOISTING APPARATUS.

Specification forming part of Letters Patent No. 201,150, dated March 12, 1878; application filed August 28, 1877.

*To all whom it may concern:*

Be it known that we, SETH H. BEVINS, of the city and State of New York, JOSEPH WEIS, of Jersey City, in the county of Hudson and State of New Jersey, and WILLIAM H. PHILLIPS, of the city and State of New York, have invented an Improvement in Hoisting Apparatus, of which the following is a specification:

In elevators for buildings the tightening-pulley for the main belt has been connected with the stopping and starting lever and with the brake mechanism. In case of the belt breaking, the stopping-lever will be moved and the brake applied through the agency of a rock-shaft. In this instance the tightening-pulley has to operate the lever that acts upon the engine as well as the brake.

Our invention consists in combining, with the belt-tightener, an independent lever and brake that act upon the main hoisting-drum in such a manner that if the belt breaks the belt-tightener operates the brake mechanism, and immediately stops the rotation of the hoisting-drum, and arrests the descent of the car or platform independently of the engine or motor.

In the drawing our improvement is shown by an elevation of a portion of the hoisting apparatus.

$a$ represents a pulley, that receives its motion from an engine of any usual character; and $b$ is the belt or chain that transmits the power to the hoisting-drum $c$. $d$ is the belt-tightening pulley, upon an arm, $e$, pivoted at $f$; and $g$ is a link or rod, connected at $h$ to the arm $e$, and at $i$ to the lever $k$ of the brake mechanism.

The brake mechanism consists of a band, $m$, connected at one end to the short arm of the lever $k$, and the other end is firmly secured at $l$.

It will now be apparent that if the belt $b$ breaks, the pulley $d$ and arm $e$ will drop, and, by the rod $g$, will move the lever $k$, operate the brake mechanism, and stop the rotation of the drum, and prevent the descent of the car or platform independent of any other parts. The dotted lines represent the position of the parts in case the belt $b$ breaks.

An adjusting-link or turn-buckle can be used in the rod $g$, whereby to adjust the parts and prevent the brake rubbing, should the belt become slack.

It is to be understood that the safety-brake mechanism aforesaid is entirely independent of, and additional to, the brake mechanism usually employed.

We are aware that the tightening-pulley has been made to operate a brake-lever; but that brake-lever and its band are also actuated by the lever and hand-rope of the hoisting apparatus or elevator; hence, in case the belt breaks, the tightening-pulley has to move the hand-rope, lever, and connected parts, in addition to the brake itself, and hence its operation may be delayed or interfered with by these additional parts. In our improvement this is avoided by the use of an entirely independent and separate brake and lever, that are only brought into action by the breaking of the belt.

We claim as our invention—

In a hoisting apparatus, the brake $m$, lever $k$, and rod $g$, connected with the arm $e$ and tightening-pulley $d$, the said brake and lever being independent of, and additional to, the ordinary brake of the hoisting apparatus, substantially as set forth.

Signed by us this 11th day of August, A. D. 1877.

S. H. BEVINS.
JOSEPH WEIS.
WM. H. PHILLIPS.

Witnesses:
GEO. T. PINCKNEY,
CHAS. H. SMITH.